United States Patent [19]

Bach

[11] Patent Number: 4,461,116
[45] Date of Patent: Jul. 24, 1984

[54] CONNECTING MEMBER

[75] Inventor: Erik Bach, Billund, Denmark

[73] Assignee: Interlego A.G., Baar, Switzerland

[21] Appl. No.: 416,054

[22] Filed: Sep. 8, 1982

[30] Foreign Application Priority Data

Sep. 14, 1981 [DK] Denmark ............................ 4078/81

[51] Int. Cl.³ ............................................ A63H 33/10
[52] U.S. Cl. ..................................... 446/128; 446/23;
446/124; 403/280
[58] Field of Search ..................... 46/29, 26, 31, 27, 28;
403/280, 381, 405; 24/213 R, 214; 339/220,
221; 411/446, 451, 455, 479

[56] References Cited

U.S. PATENT DOCUMENTS

| | | | |
|---|---|---|---|
| 2,006,813 | 7/1935 | Norwood | 24/213 R |
| 2,410,874 | 11/1946 | Greenberg et al. | 46/29 |
| 2,885,822 | 5/1959 | Onanian | 46/29 |
| 3,019,501 | 2/1962 | Kraus et al. | 24/213 R |
| 3,367,701 | 2/1968 | Wenk | 24/213 R |
| 4,361,979 | 12/1982 | Petersson | 46/26 |

FOREIGN PATENT DOCUMENTS 2410051  5/1974  Fed. Rep. of Germany ...... 403/280

Primary Examiner—Robert A. Hafer
Assistant Examiner—Perry Knutson
Attorney, Agent, or Firm—Kane, Dalsimer, Kane, Sullivan & Kurucz

[57] ABSTRACT

A connecting member comprising an elastically deformable, tubular plug (1) slitted at the ends for interconnecting pairs of building components (9a, 9b), which have coupling holes (8a, 8b) to receive the ends of the connecting member, has apertures (3) in the plug wall between the slits (2), and the plug wall is formed with lengthwise extending clamping wedges (4) between the apertures (3), said clamping wedges having inclined faces which slope towards the ends of the connecting member and causing the connecting member to be compressed at the center and be expanded at the ends when it is pressed into a pair of co-axial holes in adjacent building components. The connecting member may in particular be formed with an annular flange (5) and end beads (6a, 6b) which fit in corresponding annular grooves (7) in a pair of adjacent components (9a, 9b).

2 Claims, 7 Drawing Figures

CONNECTING MEMBER

This invention generally relates to connecting members for interconnecting pairs of components in a building set and, more particularly, to a connecting member in the form of a tubular plug of resilient material for interconnecting a pair of components in a toy building set.

Prior art in this field comprises an elastic, deformable, tubular plug provided with a pair of axially extending slits in either end thereof, so as to enable the ends of the plug to be slightly compressed when inserted in co-axially disposed complementary coupling holes in a pair of adjacent building blocks. This compression will cause the ends of the plug to exert a suitable coupling force between the plug and the inner walls of the coupling holes. This coupling force will generally suffice for detachably interconnecting a pair of toy building elements.

In some cases, however, it is desirable to provide a more or less permanent connection between a pair of adjacent components, and the object of the present invention is to provide a connecting member which, when pressed into a pair of complementary coupling holes, will exert a considerably increased coupling force, so as to interlock the two adjacent components.

According to the invention, this is achieved by providing means for causing the slitted ends of the plug to expand when subjected to an inwardly directed force on the middle portion of the plug.

In the preferred embodiment of the invention, the middle portion of the plug comprises a pair of lengthwise extending apertures disposed in alignment with the slits, and on the outer surface of the plug intermediate said apertures there are provided pairs of wedge-shaped ribs for compressing the middle portion of the plug when pressing the ends thereof into complementary coupling holes in a pair of adjacent elements.

When inserted in the coupling holes, the slitted ends of the plug are unable to expand, but their tendency to do so will cause a considerable coupling force to be exerted between the ends of the plug and the walls of the coupling holes.

Prior art also comprises a tubular connecting plug which, in addition to the slits in both ends thereof, includes an annular bead extending around each end of the plug and an annular flange around the middle portion thereof, so as to divide the plug in two identical havles.

In a further embodiment of the invention, which includes a tubular plug of this type, the lenghtwise extending apertures in the middle portion of the plug extend through the annular flange, and in this embodiment the wedges on the outer surface of the plug are disposed symmetrically with respect to the median plane of the flange and extend in both directions from the sides of the flange towards the ends of the plug.

Figure 1:
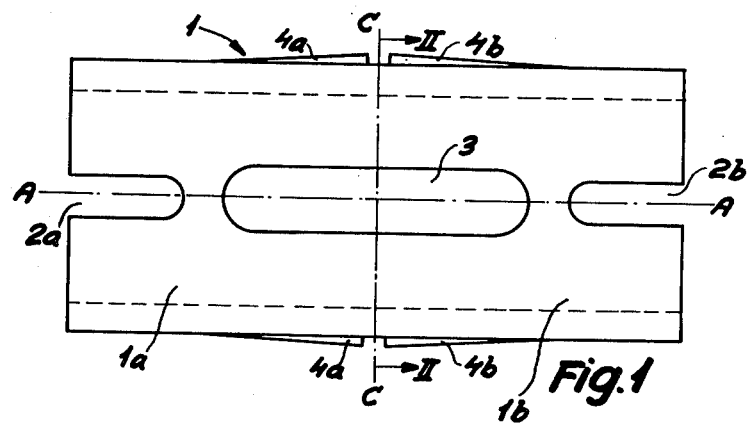
FIG. 1 is a side view showing a connecting member according to the invention.
Figure 3:
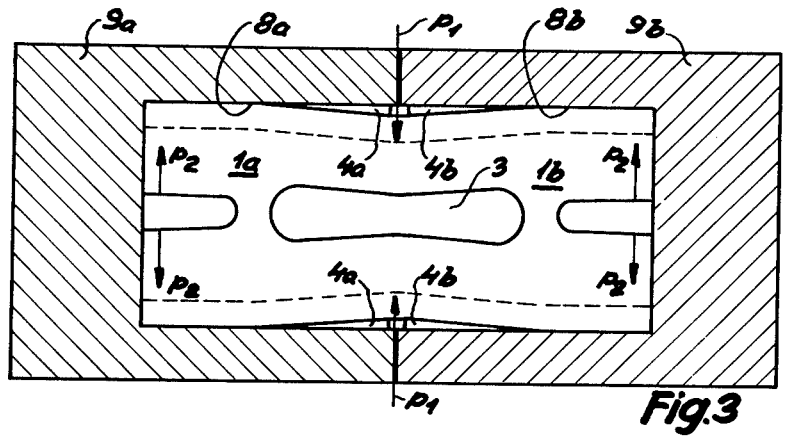
Figure 4:
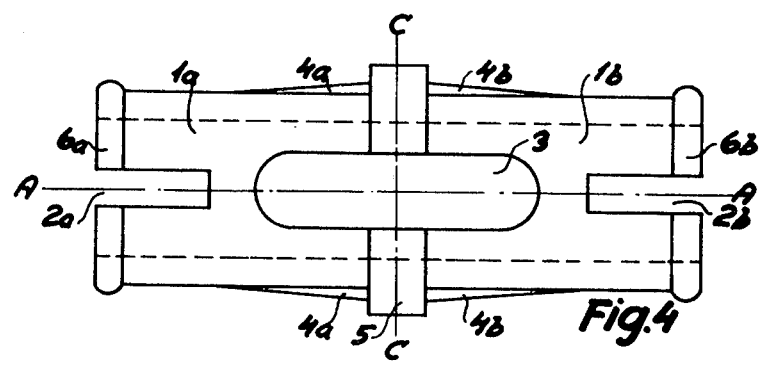
Figure 5:
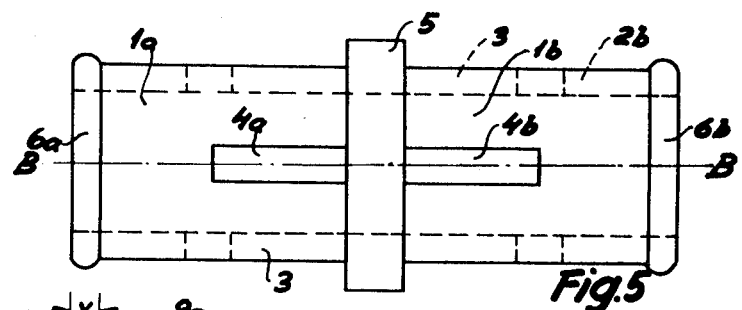
Figure 6:
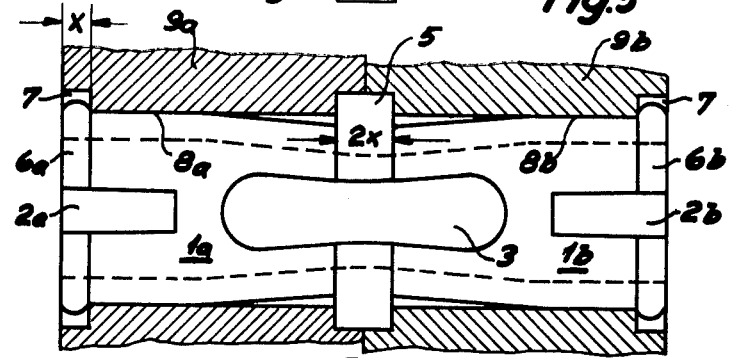
Figure 7:
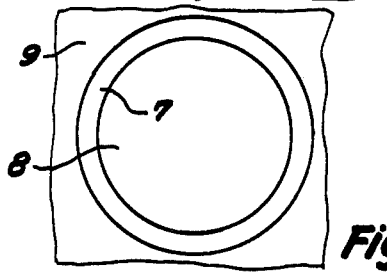

FIG. 3 is a schematic side view showing the elastic deformation of the connecting member when inserted in a pair of co-axial coupling holes in a pair of interconnected components, FIG. 4 is a side view similar to FIG. 1 showing a modified embodiment of the connecting member according to the invention, FIG. 5 is a side view of the same embodiment, but viewed in a plane perpendicular to the plane of FIG. 4, FIG. 6 is a schematic side view similar to FIG. 3 showing the elastic deformation of the connecting member shown in FIG. 4, and FIG. 7 is a sectional view showing one face of a component provided with a coupling hole and an annular recess around the periphery thereof.

Figure 2:
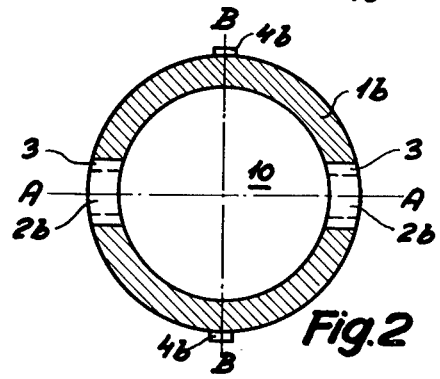
FIG. 2 is a cross section taken on the line II—II of FIG. 1.

Referring now to the embodiment shown in FIGS. 1–3, the connecting member comprises a tubular plug generally designated as 1 which is symmetrical with respect to a plane C—C perpendicular to the axis of the tubular plug 1, the cavity of which is designated as 10. The plane C—C thus divides the plug 1 into two identical halves 1a and 1b provided with a pair of lenghtwise extending slits 2a and 2b at either end of the plug.

In the middle portion of the plug there is provided a pair of lengthwise extending apertures 3 intermediate the ends slits 2a and 2b. The apertures 3 and the end slits 2a and 2b are symmetrical with respect to common axial plane A—A and also with respect to the median plane C—C.

On the outer surface of each of the two halves 1a and 1b there is provided a pair of lenghtwise extending, wedge-shaped ribs 4a and 4b disposed at either side of the median plane C—C. They are symmetrical with respect to the plane C—C and also to an axial plane B—B which is perpendicular to the plane A—A. The lenghtwise extending wedges 4a and 4b have a maximum height adjacent the plane C—C and define an inclined surface tapering towards the ends of the plug in both halves 1a and 1b thereof.

The function of this connecting member when used for interlocking a pair of components provided with complementary coupling holes 8 is as follows:

The two ends of the plug are pressed into a pair of coaxially disposed coupling holes 8a and 8b in a pair of adjacent components 9a and 9b, as schematically shown in FIG. 3. During the displacement of the plug relatively to the inner walls of the coupling holes, the wedges 4a and 4b will cause an inwardly directed force to be exerted on the middle portion of the plug and, owing to the apertures 3, this force will cause the middle portion of the plug to be slightly compressed, as indicated by the arrows $p_1$ in FIG. 3. As a result of this compression, the end portions of the plug will have a tendency to expand, as indicated by the arrows $p_2$ in FIG. 3. Thus, the clamping force $p_1$ exerted by the wedges on the middle portion of the plug and the expanding forces $p_2$ at the ends of the plug will co-operate to provide a firm interlocking of the two components 9a and 9b.

Referring next to FIGS. 4–6, the structure and performance of this connecting member are substantially the same as described with reference to FIGS. 1–3, except that the plug is here provided with annular beads 6a and 6b around the ends of the plug and with an annular flange 5 in the middle portion thereof.

So as not to prevent the compression of the middle portion of the plug, the flange 5 is interrupted by the apertures 3 which extend through the flange 5, as shown in FIGS. 4 and 6.

When using the connecting member according to the invention for interlocking a pair of components in a toy building set, it may be desirable to provide a joint wherein the end faces of the plug are flush with the adjacent sides of the components. For this purpose, it is customary to use components, such as blocks or bars, having coupling holes which extend right through the component and are provided with annular recesses 7 around the coupling holes 8 at both sides of the component. As shown in FIGS. 6 and 7, these recesses 7 have a depth x which is equal to the width of the beads 6a and 6b. Where the juxtaposed side faces of the two components coincide, as shown in the middle of FIG. 6, their co-axial recesses 7 will form a recess having a double width 2x adapted to receive the flange 5 having substantially the same width 2x.

Thus, the beads 6a and 6b in combination with the flange 5 and the recesses 7 in the components 9a and 9b provide for an assembly, wherein the ends faces of the plug are flush with the side faces of the components.

I claim:

1. A connecting member for interconnecting a pair of components in a building set, said member comprising:

a tubular plug having a cylindrical outer surface made of an elastically deformable material;

a pair of lenghtwise slits extending from each end of said plug along a first axial plane;

a pair of opposed, lenghtwise extending apertures disposed in said first plane in the middle portion of the plug;

two pairs of opposed wedges disposed on said plug cylindrical outer surface, said wedges extending lenghtwise along a second axial plane perpendicular to said first axial plane, the two wedges of each pair being disposed symetrically on opposite sides of a third plane disposed generally in the middle of the plug perpendicular to the axis of said plug, said wedges tapering inwardly from the middle portion of the plug toward the opposite ends thereof.

2. A connecting member, as claimed in claim 1, wherein the middle portion of the plug is provided with an annular flange, and wherein the apertures in the middle portion of the plug extend through the said flange.

* * * * *